US011240258B2

(12) United States Patent
Zheng

(10) Patent No.: US 11,240,258 B2
(45) Date of Patent: Feb. 1, 2022

(54) METHOD AND APPARATUS FOR IDENTIFYING NETWORK ATTACKS

(71) Applicant: ALIBABA GROUP HOLDING LIMITED, Grand Cayman (KY)

(72) Inventor: Xuejian Zheng, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 76 days.

(21) Appl. No.: 15/984,287

(22) Filed: May 18, 2018

(65) Prior Publication Data

US 2018/0278638 A1    Sep. 27, 2018

Related U.S. Application Data

(63) Continuation of application No. PCT/CN2016/105286, filed on Nov. 10, 2016.

(30) Foreign Application Priority Data

Nov. 19, 2015    (CN) .......................... 201510802440.3

(51) Int. Cl.
*H04L 29/06*    (2006.01)
*H04L 12/26*    (2006.01)

(52) U.S. Cl.
CPC ...... *H04L 63/1425* (2013.01); *H04L 63/1458* (2013.01); *H04L 63/308* (2013.01); *H04L 43/062* (2013.01)

(58) Field of Classification Search
CPC ............. H04L 63/1425; H04L 63/1458; H04L 63/308; H04L 43/062; H04L 63/1416; H04L 43/10
See application file for complete search history.

(56) References Cited

U.S. PATENT DOCUMENTS 7,171,683 B2 *   1/2007  Pazi ..................... H04L 63/1458
                                                                726/13
8,281,405 B1 *  10/2012  Gaddala .............. H04L 63/1466
                                                                726/26

(Continued)

FOREIGN PATENT DOCUMENTS

CN         101267313 A  *  9/2008  ............. G06F 21/50
CN         101267313 A      9/2008

(Continued)

OTHER PUBLICATIONS

Ahmad Aleroud, et al., Identifying DoS attacks on software defined networks: A relation context approach, Apr. 2016, 2016 IEEE/IFIP Network Operations and Management Symposium, pp. 1-5.*

(Continued)

*Primary Examiner* — Henry Tsang
*Assistant Examiner* — Suman Debnath
(74) *Attorney, Agent, or Firm* — Finnegan, Henderson, Farabow, Garrett & Dunner, LLP

(57) ABSTRACT

Embodiments of the present disclose provide a method and apparatus for identifying network attacks. The method can include: acquiring access data within at least two time periods of a target website server, wherein the access data include one or more fields; determining, for each of the at least two time periods, a quantity of access data having same content in at least two of the one or more fields; determining whether the quantities of access data for each of the at least two time periods are the same; and in response to the quantities of access data being the same, determining that at least two access requests of the access data are network attacks.

27 Claims, 6 Drawing Sheets

(56) References Cited

U.S. PATENT DOCUMENTS

| | | | |
|---|---|---|---|
| 9,038,178 B1* | 5/2015 | Lin | H04L 63/02 |
| | | | 726/23 |
| 9,577,898 B1* | 2/2017 | Baldi | H04L 47/2483 |
| 2002/0166063 A1* | 11/2002 | Lachman, III | H04L 63/1458 |
| | | | 726/23 |
| 2006/0294588 A1* | 12/2006 | Lahann | G06F 21/56 |
| | | | 726/23 |
| 2007/0094725 A1 | 4/2007 | Borders | |
| 2008/0083029 A1* | 4/2008 | Yeh | H04L 63/1441 |
| | | | 726/22 |
| 2009/0158430 A1 | 6/2009 | Borders | |
| 2009/0271865 A1* | 10/2009 | Jiang | H04L 69/22 |
| | | | 726/23 |
| 2013/0081136 A1 | 3/2013 | Jiang | |
| 2013/0333036 A1 | 12/2013 | Lahann et al. | |
| 2016/0036837 A1* | 2/2016 | Jain | H04L 63/1416 |
| | | | 726/23 |
| 2016/0156653 A1* | 6/2016 | Zhang | H04L 43/10 |
| | | | 726/23 |
| 2016/0241578 A1* | 8/2016 | Mahler | H04L 41/147 |
| 2018/0041531 A1* | 2/2018 | Ikeda | H04L 63/1425 |
| 2018/0109553 A1* | 4/2018 | Radlein | H04L 63/1441 |
| 2018/0255094 A1* | 9/2018 | Doron | H04L 63/101 |

FOREIGN PATENT DOCUMENTS

| | | | |
|---|---|---|---|
| CN | 102821081 A | | 12/2012 |
| CN | 104125193 A | | 10/2014 |
| CN | 104378358 A | | 2/2015 |
| CN | 104486298 A | | 4/2015 |
| CN | 106649370 A | * | 5/2017 |
| EP | 1431252 A2 | | 6/2004 |
| JP | 5674414 B2 | * | 10/2010 |
| JP | 2012527691 A | | 11/2012 |
| JP | 2017503293 A | | 1/2017 |
| KR | 10-2006-0056195 | | 5/2006 |
| KR | 20140051550 A | | 5/2014 |
| KR | 10-2016-0077009 | | 7/2016 |
| WO | WO 2017/084529 A1 | | 5/2017 |

OTHER PUBLICATIONS

Yi Xie, et al., Monitoring the Application-Layer DDoS Attacks for Popular Websites, Jun. 20, 2008, IEEE/ACM Transactions on Networking ( vol. 17 , Issue: 1 , Feb. 2009 ), pp. 15-25.*

PCT International Search Report and Written Opinion dated Feb. 4, 2017, issued in corresponding International Application No. PCT/CN2016/105286 (13 pgs.).

European Patent Office Communication issued for Application No. 16865706.2-1213 which encloses the extended European Search Report which includes pursuant to Rule 62 EPC, the Supplementary European Search Report (Art. 153(7) EPC) and the European search opinion, dated Nov. 19, 2018 (9 pgs.).

First Office Action issued by the State Intellectual Property Office of People's Republic of China in corresponding Chinese Application No. 201510802440.3; dated Aug. 27, 2019 (24 pgs.).

Japanese Office Action issued in Japanese Application No. 2018-523793 dated Nov. 20, 2020, 11 pages.

The Examination issued by the European Patent Office in corresponding European Application No. 16865706.2, dated May 27, 2021. (7 pages).

Japanese Search Report issued in Japanese Application No. 2018-523793 dated Oct. 6, 2020, 45 pages.

Fukase et al., "No. 8 Using statistical methods representative values and scatter," You can use it! Statistics Course, Dec. 2010, 10 pages.

* cited by examiner

METHOD AND APPARATUS FOR IDENTIFYING NETWORK ATTACKS

CROSS REFERENCE TO RELATED APPLICATION

The disclosure claims the benefits of priority to International application number PCT/CN2016/105286, filed Nov. 10, 2016 and Chinese application number 201510802440.3, filed Nov. 19, 2015, both of which are incorporated herein by reference in their entireties.

BACKGROUND

With the constant development of Internet technologies, there are increasingly more attacks against website servers, thus bringing out many adverse influences on the website servers.

At present, there are two types of manners of attacks against website servers. The first type is large-traffic network attacks, featured with short attack time but large traffic (for example, a network being attacked 10,000 times in 1 second), such as Denial of Service (DoS) and Distributed Denial of Service (DDoS). The large-traffic network attacks consume resources of a target website server by sending a large quantity of access requests to the target website server within a short time period. As a result, the target server can be overloaded and the network can be blocked, thus affecting normal access to a website.

The second type is small-traffic network attacks, featured with long attack duration but small traffic (for example, a network being attacked continuously for one day but 10 times per second). The small-traffic network attacks scan resources of a target website server by sending a small quantity of access requests to the target website server for a long time. Although only a small part of resources is scanned within a short time period, all the resources in the target website server can be obtained by scanning after a long period of time. This will undoubtedly cause security problems to the target website server. For example, an attacker may find a vulnerability in the server from the resources.

Conventionally, a method as shown in FIG. 1 can be adopted for large-traffic attacks.

In step S100, network access data packets of a target website server are acquired, and source Internet Protocol (IP) addresses of the network access data packets are parsed out from the network access data packets.

In step S110, a first quantity of identical source IP addresses is counted within a predetermined time period.

In step S120, network accesses including the source IP addresses are determined as network attacks if the first quantity reaches a predetermined threshold.

With the method, network access data packets are parsed to obtain IP addresses, a first quantity of identical IP addresses accessing a target website server is counted within a predetermined time period, and network accesses including the IP addresses are considered as network attacks if the first quantity reaches a predetermined threshold.

However, for small-traffic network attacks, the quantity of access requests within a preset time period is not large. The quantity of access requests for small-traffic network attacks is similar to the quantity of many normal access requests. And a first quantity of the small-traffic network attacks obtained with the foregoing method is always less than a predetermined threshold. Therefore, the access requests cannot be determined as network attacks through the foregoing method. It is easy to determine normal access requests as network attacks if the predetermined threshold is set to be too small in the foregoing method.

Therefore, small-traffic network attacks cannot be identified conventionally.

SUMMARY OF THE DISCLOSURE

Embodiment of the present application provide a method for identifying network attacks. The method can include: acquiring access data for at least two time periods of a target website server, wherein the access data includes one or more fields; determining, for each of the at least two time periods, a quantity of access data having same content in at least two of the one or more fields; and determining at least two access requests of the access data are network attacks based on the quantities of access data for each of the at least two time periods.

Embodiments of the application further provide an apparatus for identifying network attacks. The apparatus can include: an acquisition unit configured to acquire access data for at least two time periods of a target website server, wherein the access data includes one or more fields; a first determination unit configured to determine, for each of the at least two time periods, a quantity of access data having a same content in the at least two of the one or more fields; and a second determination unit configured to determine at least two access requests of the access data are network attacks based on the quantities of access data for each of the at least two time periods.

Embodiments of the application further provide a non-transitory computer readable medium that stores a set of instructions that is executable by at least one processor of an electronic device to cause the device to perform a method for identifying network attacks. The method can include: acquiring access data for at least two time periods of a target website server, wherein the access data includes one or more fields; determining, for each of the at least two time periods, a quantity of access data having same content in at least two of the one or more fields; and determining at least two access requests of the access data are network attacks based on the quantities of access data for each of the at least two time periods.

BRIEF DESCRIPTION OF THE DRAWINGS

In order to illustrate the technical solutions according to the embodiments of the present application or in the prior art more clearly, the accompanying drawings for describing the embodiments or the prior art are introduced briefly in the following. It is apparent that the accompanying drawings in the following description are only some embodiments of the present application. Those of ordinary skill in the art can obtain other drawings according to the accompanying drawings without any creative efforts.

DETAILED DESCRIPTION

In order to make those skilled in the art better understand the technical solutions in the present application, the technical solutions in the embodiments of the present application will be clearly and fully described below with reference to the accompanying drawings in the embodiments of the present application. It is obvious that the embodiments to be described are only a part rather than all the embodiments of the present application. All other embodiments derived by those of ordinary skill in the art based on the embodiments in the present application without creative efforts should be encompassed in the protection scope of the present application.

Figure 1:
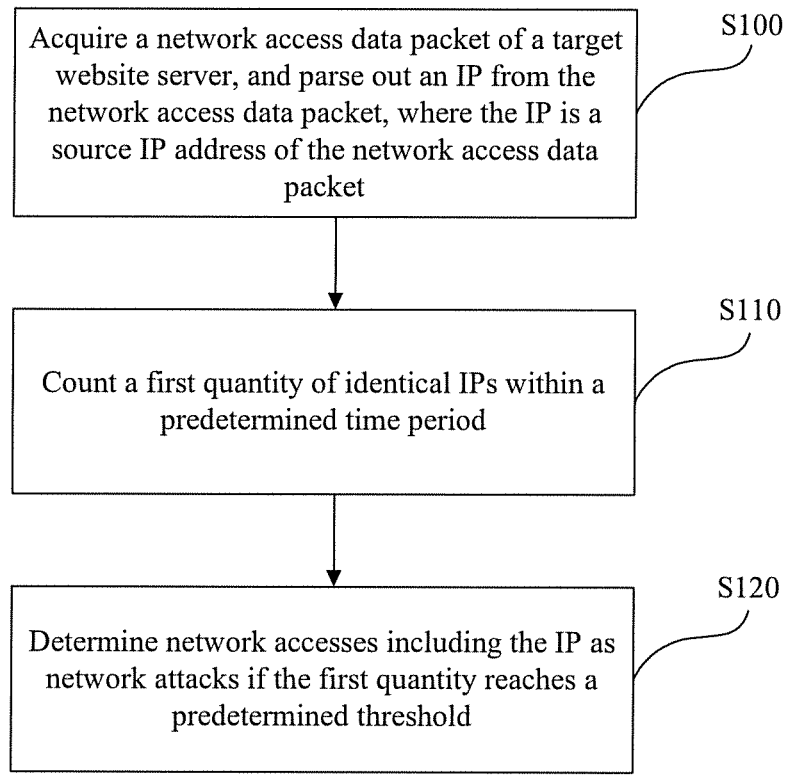
FIG. 1 is a flowchart of a method for identifying network attacks.
Figure 2:
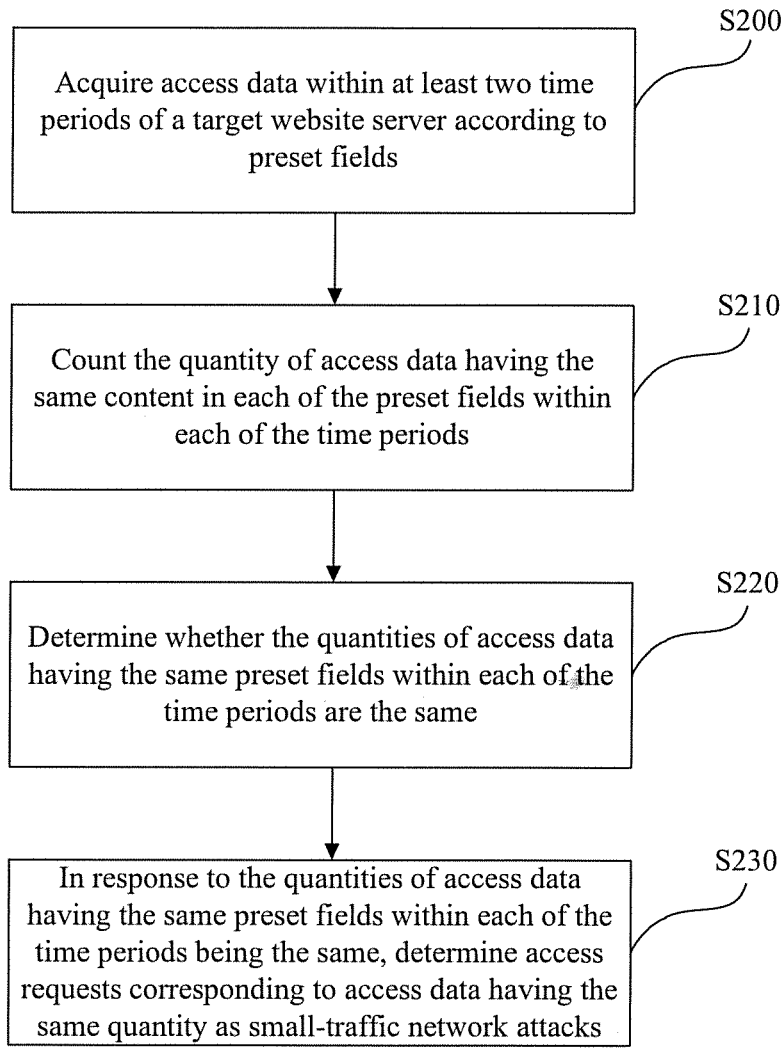
FIG. 2 is a flowchart of a method for identifying network attacks according to embodiments of the present application.

FIG. 2 is a flowchart of a method for identifying network attacks according to embodiments of the present application. The method can include steps S200-S230.

In step S200, access data of a target website server within at least two time periods can be acquired according to preset fields.

In some embodiments, the preset fields can include at least one of IP address, a host, a user agent, and a URL. The IP address can indicate a source IP address that accesses a target website. The host can indicate a domain name that accesses the target website. The user agent can indicate a browser that accesses the target website, such as Google Chrome, QQ Browser, IE Browser and the like. The user agent can also indicate a search engine that accesses the target website, such as a web crawler and the like. The URL (i.e., Uniform Resource Locator) can indicate an address that accesses the target website.

The time length of the time period can be preset. For example, the time length of the time period is 1 minute. That is, access data of a target website server within at least two 1-minute time periods is acquired according to preset fields.

In some embodiments, the time periods can include adjacent time periods.

The system can intercept an access request for accessing the target website server, parse the access request, for example, through a Java class library, and acquire content of the IP-address field in a network layer, and content of the host field, content of the user-agent field, and content of the URL field in an application layer.

In step S210, the quantity of access data having the same content in each of the preset fields within each of the time periods can be counted.

The following example 1 is access data of a target website server within 3 time periods (1 minute) acquired according to preset fields ("Host", "IP address", "User Agent").

First time period (2013-09-18 17:20:00 to 2013-09-18 17:21:00):

| Host | IP address | User Agent |
|---|---|---|
| www.aaa.com | 1.1.1.1 | Mozilla/5.0 |
| www.aaa.com | 1.1.1.2 | chrome |
| www.aaa.com | 1.1.1.3 | chrome |
| www.aaa.com | 1.1.1.1 | Mozilla/4.0 |
| www.aaa.com | 1.1.1.1 | Mozilla/5.0 |
| www.aaa.com | 1.1.1.2 | chrome |
| www.aaa.com | 1.1.1.1 | Mozilla/5.0 |

Second time period (2013-09-18 17:21:00 to 2013-09-18 17:22:00):

| Host | IP address | User Agent |
|---|---|---|
| www.aaa.com | 1.1.1.1 | Mozilla/4.0 |
| www.aaa.com | 1.1.1.1 | Mozilla/5.0 |
| www.aaa.com | 1.1.1.1 | Mozilla/4.0 |
| www.aaa.com | 1.1.1.1 | Mozilla/5.0 |

Third time period (2013-09-18 17:22:00 to 2013-09-18 17:23:00):

| Host | IP address | User Agent |
|---|---|---|
| www.aaa.com | 1.1.1.4 | chrome |
| www.aaa.com | 1.1.1.1 | Mozilla/4.0 |
| www.aaa.com | 1.1.1.1 | Mozilla/5.0 |
| www.aaa.com | 1.1.1.1 | Mozilla/4.0 |
| www.aaa.com | 1.1.1.1 | Mozilla/5.0 |

Example 1

For the content shown in the above example 1, after S210, the quantities of access data having the same content in the preset fields (the host, the IP address, the user agent) within each of the time periods are counted, as shown in the following example 2.

Within the First Time Period:

| Host | IP address | User Agent | Number of accesses |
|---|---|---|---|
| www.aaa.com | 1.1.1.1 | Mozilla/5.0 | 2 |
| www.aaa.com | 1.1.1.1 | Mozilla/4.0 | 2 |
| www.aaa.com | 1.1.1.2 | chrome | 2 |
| www.aaa.com | 1.1.1.3 | chrome | 1 |

Within the Second Time Period:

| Host | IP address | User Agent | Number of accesses |
|---|---|---|---|
| www.aaa.com | 1.1.1.1 | Mozilla/5.0 | 2 |
| wvvw.aaa.com | 1.1.1.1 | Mozilla/4.0 | 2 |

Within the Third Time Period:

| Host | IP address | User Agent | Number of accesses |
|---|---|---|---|
| www.aaa.com | 1.1.1.1 | Mozilla/5.0 | 2 |
| www.aaa.com | 1.1.1.1 | Mozilla/4.0 | 2 |
| www.aaa.com | 1.1.1.4 | chrome | 1 |

Example 2

For another example, the following example 3 includes access data of a target website server within 3 time periods (1 minute) acquired according to a preset field (e.g., the IP address).

First time period (2013-09-18 17:20:00 to 2013-09-18 17:21:00):

IP address
1.1.1.1
1.1.1.2

1.1.1.3
1.1.1.1
1.1.1.1
1.1.1.2
1.1.1.1

Second time period (2013-09-18 17:21:00 to 2013-09-18 17:22:00):
IP address
1.1.1.1
1.1.1.1
1.1.1.1
1.1.1.1

Third time period (2013-09-18 17:22:00 to 2013-09-18 17:23:00):
IP address
1.1.1.4
1.1.1.1
1.1.1.1

Example 3

For the content in the above example 3, after S210, the quantity of access data having the same content in the preset field "IP address" within each of the time periods is counted, as shown in the following example 4.

Within the First Time Period:

| IP address | Number of accesses |
|---|---|
| 1.1.1.1 | 4 |
| 1.1.1.2 | 2 |
| 1.1.1.3 | 1 |

Within the Second Time Period:

| IP address | Number of accesses |
|---|---|
| 1.1.1.1 | 4 |

Within the Third Time Period:

| IP address | Number of accesses |
|---|---|
| 1.1.1.1 | 4 |
| 1.1.1.4 | 1 |

Example 4

In step S220, it is determined whether the quantities of access data having the same preset fields within each of the time periods are the same. If the quantities of access data having the same preset fields within each of the time periods are the same, step S230 can be performed.

As shown in the above example 4, the quantities of access data including the IP address of "1.1.1.1" are the same within the first time period to the third time period, and the system performs step S230.

As shown in the above example 2, the quantities of access data having a host of "www.aaa.com", an IP address of "1.1.1.1", and a user agent of "Mozilla/5.0" are the same within the first time period to the third time period. And the quantities of access data having a host of "www.aaa.com", an IP address of "1.1.1.1", and a user agent of "Mozilla/4.0" are the same within the first time period to the third time period, and the system performs step S230.

In S230, in response to the quantities of access data having the same preset fields within each of the time periods being the same, access requests corresponding to access data having the same quantity can be determined as small-traffic network attacks.

In some embodiments, according to the features of small-traffic network attacks, it can be determined whether the quantities of access data having the same preset fields within at least two time periods are the same. If the quantities of access data having the same preset fields within at least two time periods are the same, the features of small-traffic network attacks are matched, and it can be determined that access requests corresponding to access data having the same quantity are small-traffic network attacks.

Figure 3:
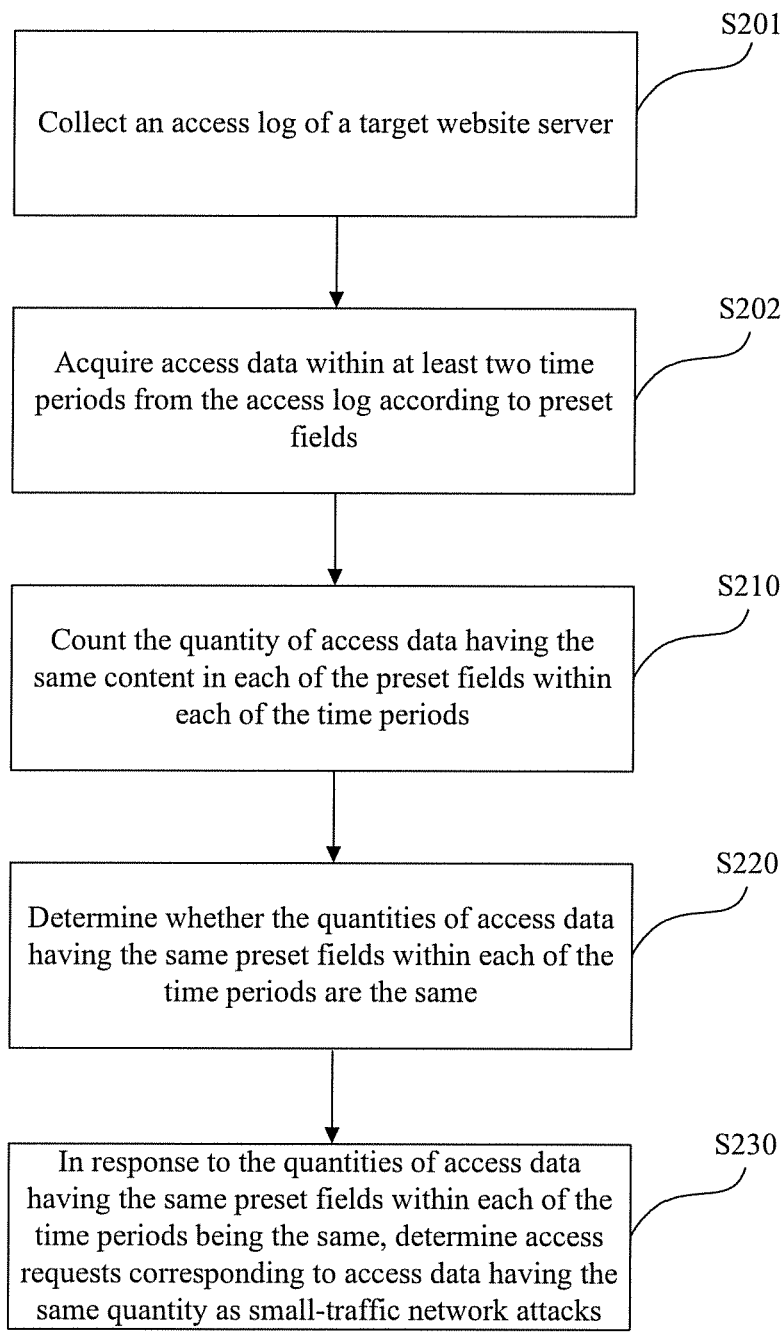
FIG. 3 is a flowchart of a method for identifying network attacks according to embodiments of the present application.

In some embodiments of the present application, as shown in FIG. 3, step S200 may further include S201 and S202.

In step S201, an access log of the target website server can be collected.

Websites are of a multi-layer architecture in the Internet. For example, website architectures can include ngnix and tomcat. As nanix and tomcat both have their own access logs, nanix and tomcat can record the same access request in their own access logs. To avoid repeatedly collecting access logs, only an access log of a most front-end application is collected when an access log of the target website server is collected. Here, nanix is a more front-end application than tomcat, and thus only the access log of nanix needs to be collected.

In step S202, access data within at least two time periods can be acquired from the access log according to the preset fields.

The preset fields can include at least one of the IP address, the host, the user agent, and the URL. The IP address can indicate a source IP address that accesses a target website. The host can indicate a domain name that accesses the target website. The user agent can indicate a browser that accesses the target website, such as Google Chrome, QQ Browser, IE Browser and the like. The user agent can also indicate a search engine that accesses the target website, such as a web crawler and the like. The URL (i.e., Uniform Resource Locator) can indicate an address that accesses the target website.

In some embodiments, after collecting the access log of the target website server, the system can acquire access data through a preset instruction. For example, the system can acquire record times in the access log through $time_local, acquire the recorded host through $host, acquire the IP address through $remote_addr, acquire the user agent through $http_user_agent, and acquire the URL through $request_uri.

For example, access data (e.g., access data since 2013-09-18 17:58:00) can be recorded. And the access data can be acquired according to the preset fields (e.g., the IP address, the host, the user agent) is shown in the following:

| Record time | Host | IP address | User Agent |
|---|---|---|---|
| 2013 Sep. 18 17:20:00 | www.aaa.com | 1.1.1.1 | Mozilla/5.0 |
| 2013 Sep. 18 17:20:02 | www.aaa.com | 1.1.1.2 | chrome |
| 2013 Sep. 18 17:20:08 | www.aaa.com | 1.1.1.3 | chrome |

-continued

| Record time | Host | IP address | User Agent |
| --- | --- | --- | --- |
| 2013 Sep. 18 17:20:15 | www.aaa.com | 1.1.1.1 | Mozilla/4.0 |
| 2013 Sep. 18 17:20:30 | www.aaa.com | 1.1.1.1 | Mozilla/5.0 |
| 2013 Sep. 18 17:20:33 | www.aaa.com | 1.1.1.2 | chrome |
| 2013 Sep. 18 17:20:45 | www.aaa.com | 1.1.1.1 | chrome |
| 2013 Sep. 18 17:21:00 | www.aaa.com | 1.1.1.1 | Mozilla/4.0 |
| 2013 Sep. 18 17:21:15 | www.aaa.com | 1.1.1.1 | Mozilla/5.0 |
| 2013 Sep. 18 17:21:30 | www.aaa.com | 1.1.1.1 | Mozilla/4.0 |
| 2013 Sep. 18 17:21:45 | www.aaa.com | 1.1.1.1 | Mozilla/5.0 |
| 2013 Sep. 18 17:22:00 | www.aaa.com | 1.1.1.4 | chrome |
| 2013 Sep. 18 17:22:00 | www.aaa.com | 1.1.1.1 | Mozilla/4.0 |
| 2013 Sep. 18 17:22:15 | www.aaa.com | 1.1.1.1 | Mozilla/5.0 |
| 2013 Sep. 18 17:22:30 | www.aaa.com | 1.1.1.1 | Mozilla/4.0 |
| 2013 Sep. 18 17:22:45 | www.aaa.com | 1.1.1.1 | Mozilla/5.0 |
| ... | | | |

In some embodiments, the time periods include adjacent time periods. The time length of the time period can be preset. For example, the time length of a time period can be preset as one minute, and access data within three time periods as shown below can be acquired.

First time period (2013-09-18 17:20:00 to 2013-09-18 17:21:00):

| Host | IP address | User Agent |
| --- | --- | --- |
| www.aaa.com | 1.1.1.1 | Mozilla/5.0 |
| www.aaa.com | 1.1.1.2 | chrome |
| www.aaa.com | 1.1.1.3 | chrome |
| www.aaa.com | 1.1.1.1 | Mozilla/4.0 |
| www.aaa.com | 1.1.1.1 | Mozilla/5.0 |
| www.aaa.com | 1.1.1.2 | chrome |
| www.aaa.com | 1.1.1.1 | Mozilla/5.0 |

Second time period (2013-09-18 17:21:00 to 2013-09-18 17:22:00):

| Host | IP address | User Agent |
| --- | --- | --- |
| www.aaa.com | 1.1.1.1 | Mozilla/4.0 |
| www.aaa.com | 1.1.1.1 | Mozilla/5.0 |
| www.aaa.com | 1.1.1.1 | Mozilla/4.0 |
| www.aaa.com | 1.1.1.1 | Mozilla/5.0 |

Third time period (2013-09-18 17:22:00 to 2013-09-18 17:23:00):

| Host | IP address | User Agent |
| --- | --- | --- |
| www.aaa.com | 1.1.1.4 | chrome |
| www.aaa.com | 1.1.1.1 | Mozilla/4.0 |
| www.aaa.com | 1.1.1.1 | Mozilla/5.0 |
| www.aaa.com | 1.1.1.1 | Mozilla/4.0 |
| www.aaa.com | 1.1.1.1 | Mozilla/5.0 |

Therefore, a larger amount of more accurate access data can be acquired according to the collected access log. The obtained access data can facilitate the system to determine, according to the features of the small-traffic network attacks, whether the numbers of accesses of a same piece of access data within a preset number of time periods are the same. If the numbers of accesses of a same piece of access data are the same, the features of the small-traffic network attacks are matched, and it can be determined that access requests including the same piece of access data are small-traffic network attacks.

A large amount of access data is generally recorded in an access log of a website server. After the system collects the access log, the access data can occupy lots of system memory if not stored in a database. As a result, the running efficiency of the system can be lowered. To solve the foregoing problem, the method may further include, after step S202, storing the access data within the at least two time periods in a database. Correspondingly, the step of counting the quantity of access data having the same content in each of the preset fields within each of the time periods can includes querying the database for access data within at least two time periods and counting the quantity of access data having the same content in each of the preset fields within each of the time periods.

In some embodiments, the database may be part of the system or an external database associated with the system. The database may also be associated with another database, to increase the storage space of the database.

The step of querying the database for access data within at least two time periods may further include querying, via the system, for the access data within the at least two time periods through a query instruction (e.g., a SQL statement).

In some embodiments, in addition to identifying small-traffic network attacks, the system also needs to deal with large-traffic network attacks. As discussed above, step S230 can include determining that whether access requests corresponding to access data having the same quantity are small-traffic network attacks. To identify large-traffic network attacks, after step S230, the method may further include: if the quantities of access data having the same preset fields within each of the time periods are different, further determining whether the quantities of access data having the same preset fields within each of the time periods are the same and reach a preset threshold.

It is determined that, if the quantities of access data having the same preset fields within each of the time periods are the same and reach the preset threshold, the method can further include determining access requests corresponding to the access data are large-traffic network attacks.

In some embodiments, the preset threshold may be an empirical value. The preset threshold may be set to match the feature of a large number of accesses during a large-traffic network attack. For example, the preset threshold is set to 10,000. For the content shown in the Example 4, the preset threshold can be 10,000 and the number of accesses of the IP address "1.1.1.4" within the third time period can be 12,000. Then, it can determined whether the number of accesses reaches the preset threshold of 10,000. As only a number of accesses of the IP address "1.1.1.4" within the third time period reaches the preset threshold, step S250 can be performed. That is, access requests including the IP address of "1.1.1.4" are determined as large-traffic network attacks.

In some embodiments, although small-traffic network attacks show a fixed attack frequency, the numbers of accesses of some small-traffic network attacks within different time periods may have a slight deviation, as shown in the following Example 5.

Within the first time period: the number of accesses of the IP address "1.1.1.1" is 8

Within the second time period: the number of accesses of the IP address "1.1.1.1" is 7

Within the third time period: the number of accesses of the IP address "1.1.1.1" is 8

Within the fourth time period: the number of accesses of the IP address "1.1.1.1" is 8

Within the fifth time period: the number of accesses of the IP address "1.1.1.1" is 9 Within the sixth time period: the number of accesses of the IP address "1.1.1.1" is 8

Example 5

In the above embodiments, the numbers of accesses of the IP address "1.1.1.1" are not exactly the same within the first time period to the sixth time period. However, such a situation where the numbers of accesses may have a slight deviation may be determined to belong to small-traffic network attacks. The tasks from the IP address "1.1.1.1" cannot be identified as the small-traffic network attacks, because the quantities of access data having the same preset fields within each of the time periods are not the same.

Figure 4:
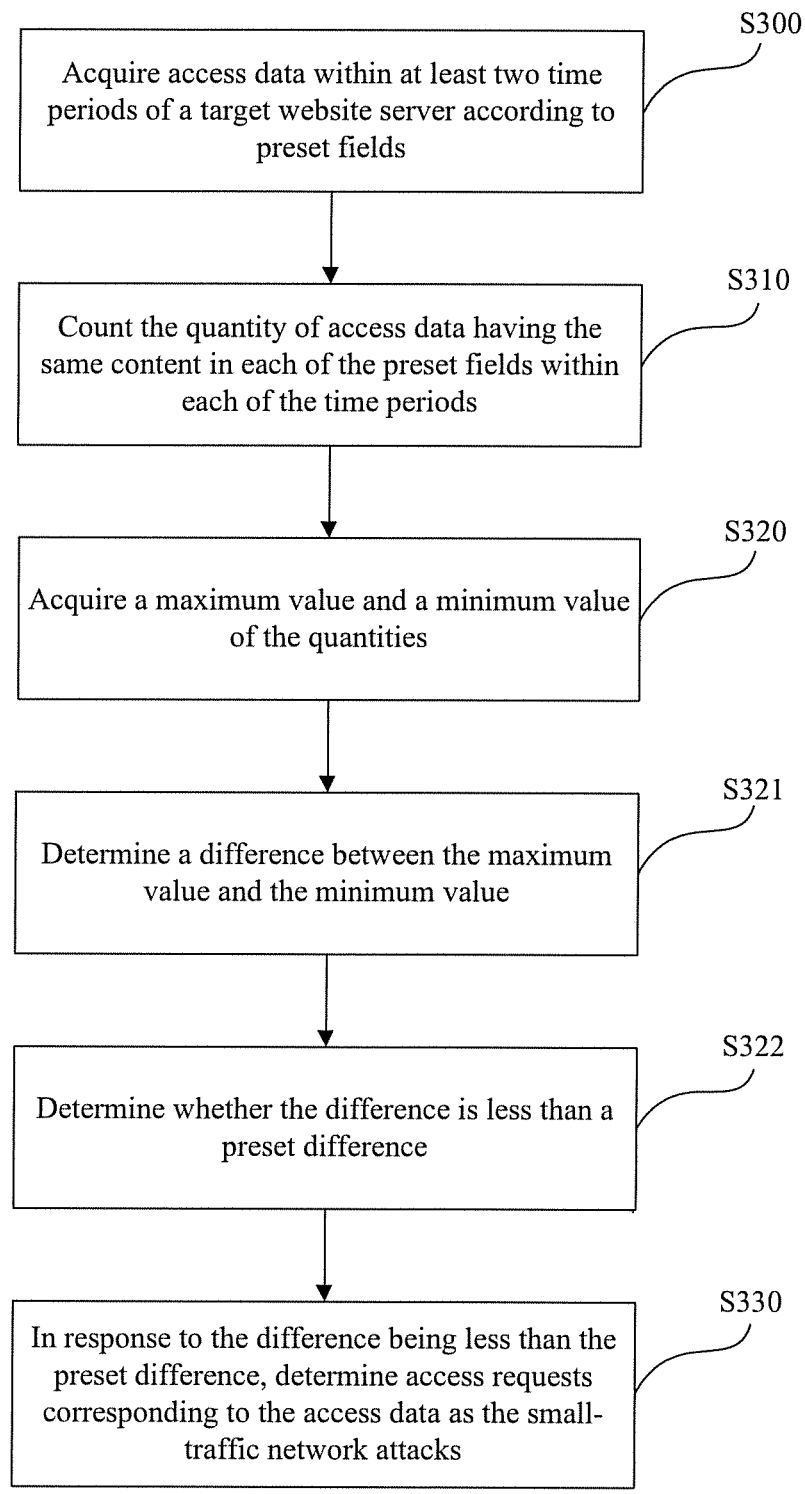
FIG. 4 is a flowchart of a method for identifying network attacks according to embodiments of the present application.

Embodiments of the disclosure further provide a method for identifying network attacks based on the above method. FIG. 4 is a flowchart of a method for identifying network attacks, according to embodiments of the present application. The method can include the following steps S300-S330.

In step S300, access data of a target website server within at least two time periods can be acquired according to preset fields. This step can be the same or similar to step S200, the description of which is omitted herein.

In step S310, the quantity of access data having the same content in each of the preset fields within each of the time periods can be counted. This step can be the same or similar to step S210, the description of which is omitted herein.

In step S320, a maximum value and a minimum value of the quantities can be determined. For the content shown in Example 5, a maximum value of the quantities of access data having the same content in the preset field (e.g., the IP address) within the six time periods can be determined as 9 and a minimum value I as 7.

In step S321, a difference between the maximum value and the minimum value can be determined. For example, a difference between the maximum value of 9 and the minimum value of 7 is 2.

In step S322, it can be determined whether the difference is less than a preset value. If the difference is less than the preset value, step S330 can be performed.

In some embodiments, the preset value may be empirical. For example, the preset value can be two. Therefore, if the determined difference is greater than the preset value (e.g., two), it can be determined that access requests having the IP address of "1.1.1.1" are not small-traffic network attacks. If the determined difference is less than or equal to the preset value, step S330 can be performed.

In step S330, it can be determined that access requests having determined difference being less than or equal to the preset value are small-traffic network attacks.

In some embodiments of the present application, step S300 may further include collecting an access log of the target website server. This step can be the same or similar to step S201, the description of which is omitted herein.

Step S300 may further include acquiring access data within at least two time periods from the access log according to the preset fields. This step can be same or similar as step S302, the description of which is omitted herein.

A larger amount of more accurate access data can be acquired according to the collected access log. The obtained access data can facilitate the system to determine, according to the features of the small-traffic network attacks, whether the numbers of accesses of the same piece of access data within a preset number of time periods are the same. If the numbers of accesses of the same piece of access data within a preset number of time periods are the same, the features of the small-traffic network attacks are matched, and it can be determined that access requests including the same piece of access data are small-traffic network attacks.

A large amount of access data is generally recorded in an access log of a website server. After the system collects the access log, the access data will occupy lots of system memory if not stored in a database. As a result, the running efficiency of the system can be lowered. In some embodiments, after the step of acquiring access data within at least two time periods from the access log according to the preset fields, the method may further include: storing the access data within the at least two time periods in a database. Correspondingly, the step of counting the quantity of access data having the same content in each of the preset fields within each of the time periods includes: querying the database for access data within at least two time periods and counting the quantity of access data having the same content in each of the preset fields within each of the time periods.

In some embodiments, in addition to identifying small-traffic network attacks, the system may also deal with large-traffic network attacks. To identify large-traffic network attacks, the method may further include, after step S330, if the determined difference is not less than the preset value, determining whether the quantities of access data having the same preset fields within each of the time periods are the same and reach a preset threshold.

If the quantities of access data having the same preset fields within each of the time periods are the same and reach the preset threshold, access requests corresponding to the access data can be determined as large-traffic network attacks.

In some embodiments, the preset threshold may be empirical. The preset threshold may be set to match the feature of a large number of accesses during a large-traffic network attack. For example, the preset threshold is set to 10,000. For the content shown in Example 4, the preset threshold can be 10,000 and the number of accesses of the IP address "1.1.1.4" within the third time period is 12,000. Then, it can be determined whether the number of accesses reaches the preset threshold of 10,000. As only the number of accesses of the IP address "1.1.1.4" within the third time period reaches the preset threshold, access requests including the IP address "1.1.1.4" can be determined as large-traffic network attacks.

Figure 5:
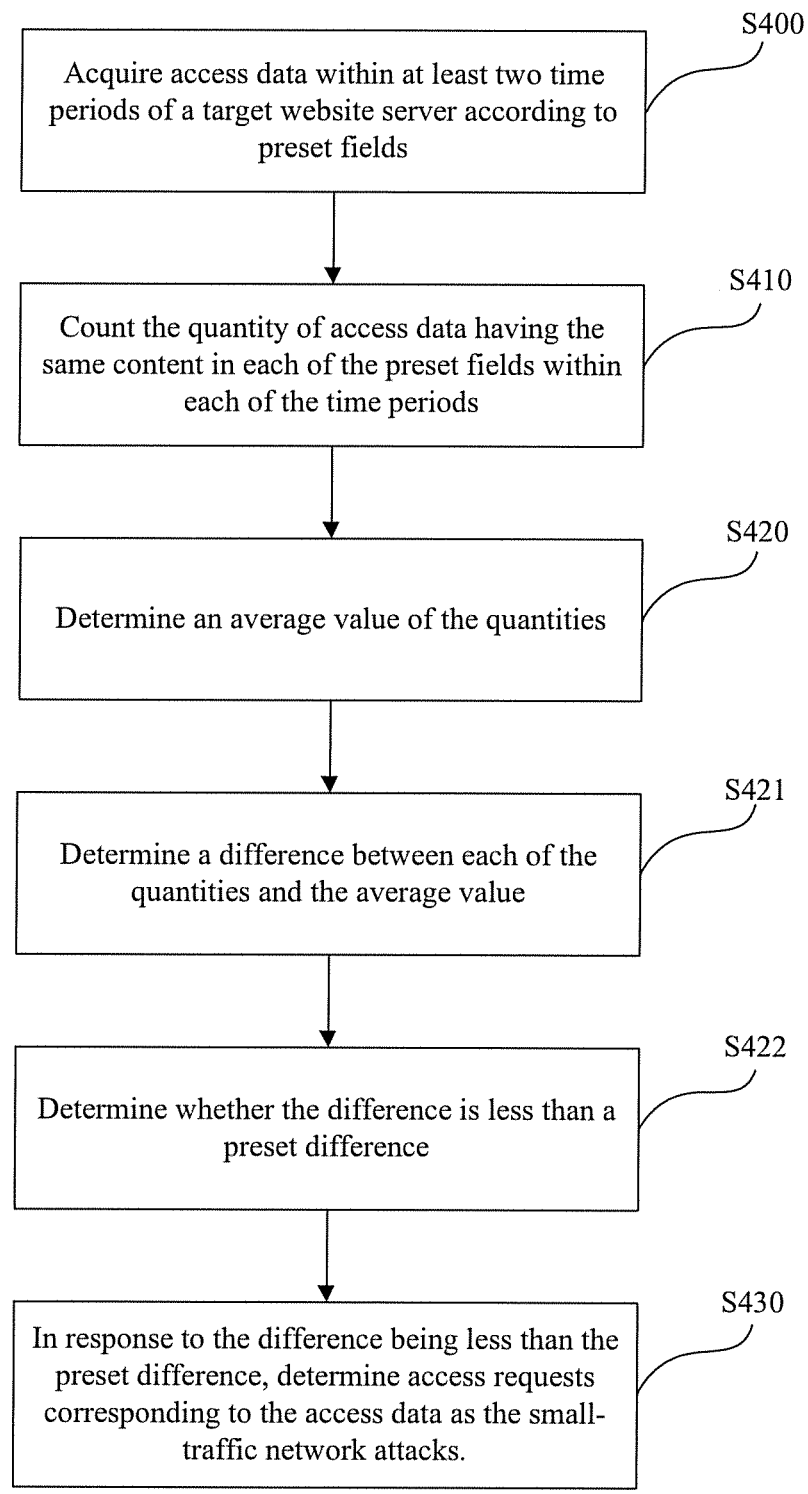
FIG. 5 is a flowchart of a method for identifying network attacks according to embodiments of the present application.

To solve the problem shown in Example 5, FIG. 5 is a flowchart of a method for identifying network attacks, according to some embodiments of the present application. The method can include S400-S430.

In step S400, access data within at least two time periods of a target website server can be acquired according to preset fields.

This step can be same or similar as step S200, the description of which is omitted herein.

In step S410, the quantity of access data having the same content in each of the preset fields within each of the time periods can be counted.

This step can be same or similar as step S210, the description of which is omitted herein.

In step S420, an average value of the quantities can be determined.

For the content shown in Example 5, it is determined that an average value of the quantities (e.g., 8, 7, 8, 8, 9, 8) is 8.

In step S421, a difference between each of the quantities and the average value can be determined.

A difference between each of the quantities and the average value can be determined as below.

A difference within the first time period is 0
A difference within the first time period is 1
A difference within the first time period is 0
A difference within the first time period is 0
A difference within the first time period is 1
A difference within the first time period is 0

In step S422, it is determined whether each difference is less than a preset value. If each difference is less than the preset value, step S430 can be performed.

In the above example, if the preset value is 0.5, each difference is not less than the preset value. Thus it can be determined that access requests including the IP address "1.1.1.1" are not small-traffic network attacks. In configurations where the preset value is greater than 1, each difference would be less than the preset value, and step S430 would be performed.

In step S430, it is determined that, if each difference is less than the preset value, access requests corresponding to the access data can be determined as small-traffic network attacks.

In some embodiments of the present application, step S400 may further include: collecting an access log of the target website server. This step can be same or similar as step S201, description of which is omitted herein.

Step S400 may further include acquiring access data within at least two time periods from the access log according to the preset fields. This step can be the same or similar to step S202, description of which is omitted herein.

A larger amount of accurate access data can be acquired according to the collected access log. The access data obtained can facilitate the system to determine, according to the features of the small-traffic network attacks, whether the numbers of accesses of the same piece of access data within a preset number of time periods are the same. If the numbers of accesses of the same piece of access data within a preset number of time periods are the same, the features of the small-traffic network attacks are matched, and it can be determined that access requests including the same piece of access data are small-traffic network attacks.

A large amount of access data is generally recorded in an access log of a website server. After the system collects the access log, the access data can occupy lots of system memory if not stored in a database. As a result, the running efficiency of the system can be lowered. To solve the foregoing problem, in embodiments of the application, after the step of acquiring access data within at least two time periods from the access log according to the preset fields, the method may further include: storing the access data within the at least two time periods in a database. Correspondingly, the step of counting the quantity of access data having the same content in each of the preset fields within each of the time periods includes: querying the database for access data within at least two time periods and counting the quantity of access data having the same content in each of the preset fields within each of the time periods.

In some embodiments, in addition to identifying small-traffic network attacks, the system may also deal with large-traffic network attacks. To identify large-traffic network attacks, the method may further include, after step S430, if each difference is not less than a preset difference, determining whether the quantities of access data having the same preset fields within each of the time periods are the same and reach a preset threshold.

If the quantities of access data having the same preset fields within each of the time periods are the same and reach the preset threshold, the method may further include determining access requests corresponding to the access data as large-traffic network attacks.

In some embodiments, the preset threshold may be an artificially set empirical value. The preset threshold may be set to match the feature of a large number of accesses during a large-traffic network attack. For example, the preset threshold is set to 10,000. For the content shown in Example 4, the preset threshold can be 10,000 and the number of accesses of the IP address "1.1.1.4" within the third time period is 12,000. Then, it can be determined whether the number of accesses reaches the preset threshold of 10,000. As only the number of accesses of the IP address "1.1.1.4" within the third time period reaches the preset threshold, access requests including the IP address "1.1.1.4" can be determined as large-traffic network attacks.

Embodiments of the present application further provide an apparatus implementing the steps of the method. The apparatus can be implemented by software, and can also be implemented by hardware or in a manner of combining software and hardware. By taking the software implementation as an example, an apparatus in a logical sense is formed by a Central Process Unit (CPU) of a server reading a corresponding computer program instruction into a memory for running.

Figure 6:
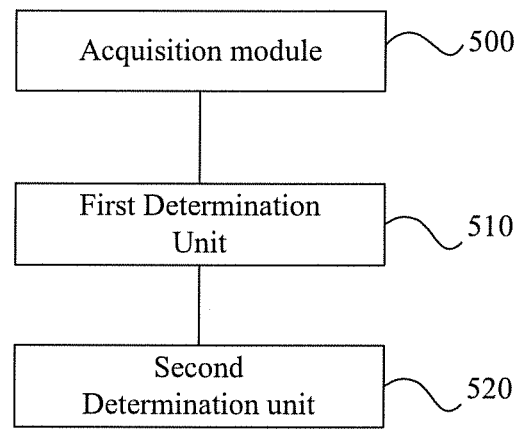
FIG. 6 is a schematic diagram of an apparatus for identifying network attacks according to embodiments of the present application.

FIG. 6 illustrates a schematic diagram of a website anti-attack apparatus according to embodiments of the present application. The apparatus can include units 500-520.

An acquisition unit 500 can be configured to acquire access data within at least two time periods of a target website server, wherein the access data include one or more fields.

A first determination unit 510 can be configured to determine, for each of the at least two time periods, a quantity of access data having a same content in the at least some of the one or more fields.

A second determination unit 520 can be configured to determine whether the quantities of access data having the same preset fields within each of the time periods are the same, and in response to the quantities of access data being the same, determine that at least some access requests of the access data are small-traffic network attacks.

Acquisition unit 500 may further include: a first acquisition subunit configured to collect an access log of the target website server; and a second acquisition subunit configured to acquire access data within at least two time periods from the access log according to the preset fields.

The first acquisition subunit can be further configured to collect an access log of a most front-end application of the target website server.

The apparatus further includes: a storage unit configured to store the access data within the at least two time periods in a database. Correspondingly, first determination unit 510 can be further configured to query the database for access data within at least two time periods, and count the quantity of access data having the same content in each of the preset fields within each of the time periods.

The time periods include adjacent time periods.

The preset fields include at least one of an IP address, a host, a user agent, and a URL.

Embodiments of the disclosure further provide an apparatus for identifying network attacks. The apparatus can include: an acquisition unit configured to acquire access data for at least two time periods of a target website server, wherein the access data includes one or more fields; a first determination unit configured to determine, for each of the at least two time periods, a quantity of access data having a same content in the at least some of the one or more fields; a second acquisition unit configured to acquire a maximum value and a minimum value of the quantities; a third determination unit configured to determine a difference between the maximum value and the minimum value; and a fourth determination unit configured to determine access requests corresponding to the access data as the small-traffic network based on the determined difference.

The acquisition unit can further include a first acquisition subunit configured to collect an access log of the target website server; and a second acquisition subunit configured to acquire the access data within at least two time periods from the access log.

The first acquisition subunit can be further configured to collect an access log of a front-end application of the target website server.

The apparatus can further include a storage unit configured to store the access data within the at least two time periods in a database, and the first determination unit can be further configured to query the database for access data within at least two time periods, and count the quantity of access data having the same content in each of the preset fields within each of the time periods.

Embodiments of the disclosure can further provide an apparatus for identifying network attacks. The apparatus can include an acquisition unit configured to acquire access data for at least two time periods of a target website server, wherein the access data includes one or more fields; a first determination unit configured to determine, for each of the at least two time periods, a quantity of access data having a same content in the at least some of the one or more fields; an average determination unit configured to determine an average value of the access data having the same content in at least some of the one or more fields; and a fifth determination unit configured to determine a difference between the quantities of access data in each of the at least two periods and the average value; determine whether the difference is less than a preset threshold; and determine access requests corresponding to the access data are the small-traffic network attacks based on the difference.

The acquisition unit can further include: a first acquisition subunit configured to collect an access log of the target website server; and a second acquisition subunit configured to acquire the access data within at least two time periods from the access log.

The first acquisition subunit is further configured to collect an access log of a front-end application of the target website server.

The apparatus can further include a storage unit configured to store the access data within the at least two time periods in a database, and the first determination unit can be further configured to query the database for access data within at least two time periods, and count the quantity of access data having the same content in each of the preset fields within each of the time periods.

The time periods comprise adjacent time periods. The fields can include at least one of an Internet Protocol (IP) address, a domain name that accesses the target website, a browser that accesses the target website, and an Uniform Resource Locator (URL).

In the 1990s, an improvement on a technology may be obviously distinguished as an improvement on hardware (for example, an improvement on a circuit structure such as a diode, a transistor, and a switch) or an improvement on software (an improvement on a method procedure). However, with the development of technologies, improvements of many method procedures at present may be considered as direct improvements on hardware circuit structures. Almost all designers program improved method procedures into hardware circuits to obtain corresponding hardware circuit structures. Therefore, it is improper to assume that the improvement of a method procedure cannot be implemented by using a hardware entity module. For example, a Programmable Logic Device (PLD) (such as a Field Programmable Gate Array (FPGA)) is such an integrated circuit whose logic functions are determined by devices programmed by a user. Designers program by themselves to "integrate" a digital system into a piece of PLD, without the need to ask a chip manufacturer to design and manufacture a dedicated integrated circuit chip. Moreover, at present, the programming is mostly implemented by using "logic compiler" software, instead of manually manufacturing an integrated circuit chip. The logic compiler software is similar to a software complier used for developing and writing a program, and original codes before compiling also are written by using a specific programming language, which is referred to as a Hardware Description Language (HDL). There are many types of HDLs, such as Advanced Boolean Expression Language (ABEL), Altera Hardware Description Language (AHDL), Confluence, Cornell University Programming Language (CUPL), HDCal, Java Hardware Description Language (JHDL), Lava, Lola, MyHDL, PALASM, and Ruby Hardware Description Language (RHDL), among which Very-High-Speed Integrated Circuit Hardware Description Language (VHDL) and Verilog are most commonly used now. Those skilled in the art also should know that a hardware circuit for implementing the logic method procedure may be easily obtained only by slightly logically programming the method procedure using the above several hardware description languages and programming it into an integrated circuit. Accordingly, it is appreciated that the embodiments described herein can involve hardware, software, or a combination thereof.

A controller may be implemented in any suitable manner. For example, the controller may be in the form of a microprocessor or a processor and a computer readable medium storing a computer readable program code (for example, software or firmware) executable by the (micro) processor, a logic gate, a switch, an Application Specific Integrated Circuit (ASIC), a programmable logic controller, and an embedded micro-controller. Examples of the controller include, but are not limited to, the following microcontrollers: ARC 625D, Atmel AT91SAM, Microchip PIC18F26K20, and Silicone Labs C8051F320. A memory controller may also be implemented as a part of control logic of a memory. It is appreciated that the controller can be implemented by using pure computer readable program codes, and in addition, the method steps may be logically programmed to enable the controller to implement the same function in the form of a logic gate, a switch, an ASIC, a programmable logic controller, and an embedded microcontroller. Therefore, this type of controller may be considered as a hardware component, and apparatuses included in the controller for implementing various functions may also be considered as structures inside the hardware component. Or, the apparatuses used for implementing various functions may even be considered as both software modules for implementing the method and structures inside the hardware component.

The system, apparatus, module or unit illustrated in the above embodiments may be implemented by using a computer chip or an entity, or a product having a certain function.

For ease of description, when the apparatus is described, it is divided into various units based on functions for respective descriptions. When the present application is implemented, the functions of the units may be implemented in the same or multiple software and/or hardware.

It is appreciated that the embodiments of the present invention may be provided as a method, a system, or a computer program product. Therefore, the present invention may be implemented as a complete hardware embodiment, a complete software embodiment, or an embodiment combining software and hardware. Moreover, the present invention may be a computer program product implemented on one or more computer usable storage media (including, but not limited to, a magnetic disk memory, a CD-ROM, an optical memory, and the like) including computer usable program codes.

The present disclosure is described with reference to flowcharts and/or block diagrams of the method, device (system) and computer program product according to the embodiments of the present invention. It should be understood that a computer program instruction may be used to implement each process and/or block in the flowcharts and/or block diagrams and combinations of processes and/or blocks in the flowcharts and/or block diagrams. These computer program instructions may be provided to a general-purpose computer, a special-purpose computer, an embedded processor or a processor of any other programmable data processing device to generate a machine, such that the instructions executed by a computer or a processor of any other programmable data processing device generate an apparatus for implementing a function specified in one or more processes in the flowcharts and/or in one or more blocks in the block diagrams.

These computer program instructions may also be stored in a computer readable storage that can instruct the computer or any other programmable data processing device to work in a particular manner, such that the instructions stored in the computer readable storage generate an artifact that includes an instruction apparatus. The instruction apparatus implements a function specified in one or more processes in the flowcharts and/or in one or more blocks in the block diagrams.

These computer program instructions may also be loaded onto a computer or another programmable data processing terminal device, such that a series of operation steps are performed on the computer or another programmable device, thereby generating computer-implemented processing. Therefore, the instructions executed on the computer or another programmable terminal device provide steps for implementing a function specified in one or more processes in the flowcharts and/or in one or more blocks in the block diagrams.

In a typical configuration, a computation device includes one or more central processing units (CPU), an input/output interface, a network interface, and a memory.

The memory may include computer readable media such as a volatile memory, a Random Access Memory (RAM), and/or non-volatile memory, e.g., Read-Only Memory (ROM) or flash RAM. The memory is an example of a computer readable medium.

The computer readable medium includes non-volatile and volatile media as well as movable and non-movable media and can implement information storage by means of any method or technology. Information may be a computer readable instruction, a data structure, and a module of a program or other data. An example of a storage medium of a computer includes, but is not limited to, a phase change memory (PRAM), a static random access memory (SRAM), a dynamic random access memory (DRAM), other types of RAMs, a ROM, an electrically erasable programmable read-only memory (EEPROM), a flash memory or other memory technologies, a compact disk read-only memory (CD-ROM), a digital versatile disc (DVD) or other optical storages, a cassette tape, a magnetic tape/magnetic disk storage or other magnetic storage devices, or any other non-transmission medium, and can be used to store information accessible by the computing device. According to the definition in this text, the computer readable medium does not include transitory media, such as a modulated data signal and a carrier.

It should be further noted that, the terms "include", "comprise" or their other variations are intended to cover non-exclusive inclusion, so that a process, method, commodity or device including a series of elements not only includes the elements, but also includes other elements not clearly listed, or further includes inherent elements of the process, method, commodity or device. In a case without any more limitations, an element defined by "including a/an . . . " does not exclude that the process, method, commodity or device including the element further has other identical elements.

Those skilled in the art should understand that the embodiments of the present application may be provided as a method, a system, or a computer program product. Therefore, the present application may be implemented as a complete hardware embodiment, a complete software embodiment, or an embodiment combining software and hardware. Moreover, the present application may be in the form of a computer program product implemented on one or more computer usable storage media (including, but not limited to, a magnetic disk memory, a CD-ROM, an optical memory and the like) including computer usable program codes.

The present application may be described in a common context of a computer executable instruction executed by a computer, for example, a program module. Generally, the program module includes a routine, a program, an object, an assembly, a data structure, and the like used for executing a specific task or implementing a specific abstract data type. The present application may also be implemented in distributed computing environments, and in the distributed computer environments, a task is executed by using remote processing devices connected through a communications network. In the distributed computer environments, the program module may be located in local and remote computer storage media including a storage device.

The embodiments in the specification are described progressively, identical or similar parts of the embodiments may be obtained with reference to each other, and each embodiment emphasizes a part different from other embodiments. The system embodiment can be similar to the method embodiment, so it is described simply. For related parts, reference may be made to the descriptions of the parts in the method embodiment.

The above descriptions are merely embodiments of the present application, and are not intended to limit the present application. It is appreciated that, the present application may have various modifications and variations. Any modification, equivalent replacement, improvement or the like made without departing from the spirit and principle of the present application should all fall within the scope of claims of the present application.

What is claimed is:

1. A method for identifying network attacks, comprising:
acquiring a plurality of access data sets for each of at least two time periods of a target website server, each of the plurality of access data sets including one or more fields;
determining, for each of the at least two time periods, a quantity of access data sets having a same field of the one or more fields; and
determining that at least two access requests of the plurality of access data sets are network attacks based on at least one of:
a difference between a maximum value and a minimum value of quantities of access data sets having the same field in the at least two time periods, or
a difference between the quantity of the access data sets in each of the at least two time periods and an average value of the quantities of the access data sets having the same field in the at least two time periods.

2. The method of claim 1, wherein acquiring the plurality of access data sets for each of the at least two time periods of the target website server further comprises:
collecting an access log of the target website server; and
acquiring the access data sets within the at least two time periods from the access log.

3. The method of claim 2, wherein collecting the access log of the target website server further comprises:
collecting an access log of a front-end application of the target website server.

4. The method of claim 2, wherein after acquiring the plurality of access data sets for each of the at least two time periods from the access logs, the method further comprises:
storing the plurality of access data sets within the at least two time periods in a database, and
wherein determining, for each of the at least two time periods, the quantity of access data sets having the same field of the one or more fields further comprises:
querying the database for the access data sets within the at least two time periods, and
counting the quantity of the access data sets having the same field for each of the at least two time periods.

5. The method of claim 1, wherein determining that the at least two access requests of the plurality of access data sets are the network attacks further comprises:
determining whether the quantities of the access data sets having the same field for the at least two time periods are the same; and
in response to the quantities of the access data sets having the same field being the same, determining that the at least two access requests of the plurality of access data sets are the network attacks.

6. The method of claim 1, wherein determining that the at least two access requests of the plurality of access data sets are the network attacks further comprises:
acquiring the maximum value and the minimum value of the quantities of the access data sets having the same field;
determining the difference between the maximum value and the minimum value; and
determining the at least two access requests of the plurality of access data sets as the network attacks in response to a determination that the difference is less than a preset threshold.

7. The method of claim 1, wherein determining that the at least two access requests of the plurality of access data sets are the network attacks further comprises:
determining the average value of the quantities of the access data sets having the same field;
determining the difference between the quantity of the access data sets in each of the at least two time periods and the average value; and
determining that the at least two access requests of the plurality of access data sets are the network attacks in response to a determination that the difference is less than a preset threshold.

8. The method of claim 1, wherein the at least two time periods comprise adjacent time periods.

9. The method of claim 1, wherein the one or more fields comprise at least one of an Internet Protocol (IP) address, a domain name that accesses the target website, a browser that accesses the target website, or an Uniform Resource Locator (URL).

10. An apparatus for identifying network attacks, comprising:
a memory device storing instructions; and
a processor arranged to execute the instructions to cause the apparatus to:
acquire a plurality of access data sets for at least two time periods of a target website server, each of the plurality of access data sets including one or more fields;
determine, for each of the at least two time periods, a quantity of access data sets having a same field of the one or more fields; and
determine that at least two access requests of the plurality of access data sets are network attacks based on at least one of:
a difference between a maximum value and a minimum value of quantities of access data sets having the same field in the at least two time periods, or
a difference between the quantity of the access data sets in each of the at least two time periods and an average value of the quantities of the access data sets having the same field in the at least two time periods.

11. The apparatus of claim 10, wherein the processor is arranged to execute the instructions to cause the apparatus to:
collect an access log of the target website server; and
acquire the access data sets within the at least two time periods from the access log.

12. The apparatus of claim 11, wherein the processor is arranged to execute the instructions to cause the apparatus to collect an access log of a front-end application of the target website server.

13. The apparatus of claim 11, wherein the processor is arranged to execute the instructions to cause the apparatus to:
store the plurality of access data sets within the at least two time periods in a database, and
query the database for the access data sets within the at least two time periods; and
count the quantity of the access data sets having the same field for each of the at least two time periods.

14. The apparatus of claim 10, wherein the processor is arranged to execute the instructions to cause the apparatus to:
determine whether the quantities of the access data sets having the same field for the at least two time periods are the same, and
in response to the quantities of the access data sets having the same field being the same, determine that the at least two access requests of the plurality of access data sets are the network attacks.

15. The apparatus of claim 10, wherein the processor is arranged to execute the instructions to cause the apparatus to:
    acquire the maximum value and the minimum value of the quantities of the access data sets having the same field;
    determine the difference between the maximum value and the minimum value; and
    determine the at least two access requests of the plurality of access data sets as the network attacks in response to a determination that the difference is less than a preset threshold.

16. The apparatus of claim 10, wherein the processor is arranged to execute the instructions to cause the apparatus to:
    determine the average value of the quantities of the access data sets having the same field;
    determine the difference between the quantity of the access data sets in each of the at least two periods and the average value;
    determine whether the difference is less than a threshold; and
    determine that the at least two access requests of the plurality of access data sets are the network attacks in response to a determination that the difference is less than the threshold.

17. The apparatus of claim 10, wherein the at least two time periods comprise adjacent time periods.

18. The apparatus of claim 10, wherein the one or more fields comprise at least one of an Internet Protocol (IP) address, a domain name that accesses the target website, a browser that accesses the target website, or an Uniform Resource Locator (URL).

19. A non-transitory computer readable medium that stores a set of instructions that is executable by at least one processor of an electronic device to cause the device to perform a method for identifying network attacks, the method comprising:
    acquiring a plurality of access data sets for each of at least two time periods of a target website server, each of the plurality of access data sets including one or more fields;
    determining, for each of the at least two time periods, a quantity of access data sets having a same field of the one or more fields; and
    determining that at least two access requests of the plurality of access data sets are network attacks based on at least one of:
        a difference between a maximum value and a minimum value of quantities of access data sets having the same field in the at least two time periods, or
        a difference between the quantity of the access data sets in each of the at least two time periods and an average value of the quantities of the access data sets having the same field in the at least two time periods.

20. The non-transitory computer readable medium of claim 19, wherein acquiring the plurality of access data sets for each of the at least two time periods of the target website server further comprises:
    collecting an access log of the target website server; and
    acquiring the access data sets within the at least two time periods from the access log.

21. The non-transitory computer readable medium of claim 20, wherein collecting the access log of the target website server further comprises:
    collecting an access log of a front-end application of the target website server.

22. The non-transitory computer readable medium of claim 20, wherein after acquiring the plurality of access data sets for each of the at least two time periods from the access logs, the set of instructions is further executable by the at least one processor of the electronic device to perform:
    storing the plurality of access data sets within the at least two time periods in a database, and
    wherein determining, for each of the at least two time periods, the quantity of access data sets having the same field of the one or more fields further comprises:
    querying the database for the access data sets within the at least two time periods, and
    counting the quantity of the access data sets having the same field for each of the at least two time periods.

23. The non-transitory computer readable medium of claim 19, wherein determining the at least two access requests of the plurality of access data sets are the network attacks further comprises:
    determining whether the quantities of the access data sets having the same field for the at least two time periods are the same; and
    in response to the quantities of the access data sets having the same field being the same, determining that the at least two access requests of the plurality of access data sets are the network attacks.

24. The non-transitory computer readable medium of claim 19, wherein determining that the at least two access requests of the plurality of access data sets are the network attacks further comprises:
    acquiring the maximum value and the minimum value of the quantities of the access data sets having the same field;
    determining the difference between the maximum value and the minimum value; and
    determining the at least two access requests of the plurality of access data sets as the network attacks in response to a determination that the difference is less than a preset threshold.

25. The non-transitory computer readable medium of claim 19, wherein determining that the at least two access requests of the plurality of access data sets are the network attacks further comprises:
    determining the average value of the quantities of the access data sets having the same field;
    determining the difference between the quantity of the access data sets in each of the at least two time periods and the average value; and
    determining that the at least two access requests of the plurality of access data sets are the network attacks in response to a determination that the difference is less than a preset threshold.

26. The non-transitory computer readable medium of claim 19, wherein the at least two time periods comprise adjacent time periods.

27. The non-transitory computer readable medium of claim 19, wherein the fields comprise at least one of an Internet Protocol (IP) address, a domain name that accesses the target website, a browser that accesses the target website, or an Uniform Resource Locator (URL).

* * * * *